United States Patent
Couch et al.

(10) Patent No.: US 8,142,106 B2
(45) Date of Patent: Mar. 27, 2012

(54) SUBSURFACE SEWAGE DISPOSAL AND WASTEWATER TREATMENT SYSTEM

(75) Inventors: Richard E. Couch, Milford, CT (US); John M. Laudano, Middletown, CT (US)

(73) Assignee: Richard E. Couch, Milford, CT (US)

(*) Notice: Subject to any disclaimer, the term of this patent is extended or adjusted under 35 U.S.C. 154(b) by 0 days.

(21) Appl. No.: 12/953,599

(22) Filed: Nov. 24, 2010

(65) Prior Publication Data
US 2011/0062069 A1   Mar. 17, 2011

Related U.S. Application Data

(63) Continuation of application No. 12/328,068, filed on Dec. 4, 2009, now abandoned.

(60) Provisional application No. 60/992,762, filed on Dec. 6, 2007, provisional application No. 61/092,420, filed on Aug. 28, 2008.

(51) Int. Cl.
*E02B 11/00* (2006.01)

(52) U.S. Cl. .......... 405/36; 405/45; 405/51; 210/170.08

(58) Field of Classification Search .............. 405/36, 405/38, 43–47, 51; 210/170.08, 532.2
See application file for complete search history.

(56) References Cited

U.S. PATENT DOCUMENTS

| | | | | |
|---|---|---|---|---|
| 4,192,628 A * | 3/1980 | Gorman | .......... | 405/45 |
| 4,880,333 A * | 11/1989 | Glasser et al. | .......... | 405/43 |
| 5,597,264 A * | 1/1997 | Laak | .......... | 405/36 |
| 6,821,424 B1 * | 11/2004 | Branz | .......... | 210/605 |
| 2004/0091320 A1 * | 5/2004 | Parker | .......... | 405/45 |
| 2005/0205495 A1 * | 9/2005 | Barrett et al. | .......... | 210/688 |
| 2006/0272988 A1 * | 12/2006 | Potts | .......... | 210/170.01 |

* cited by examiner

*Primary Examiner* — John Kreck
*Assistant Examiner* — Sean Andrish
(74) *Attorney, Agent, or Firm* — Michaud-Kinney Group LLP

(57) ABSTRACT

A modular subsurface sewage disposal and wastewater treatment system is presented for treating effluent from a septic tank. The system includes an elongated member, leach field medium and at least one pipe. The elongated member is arranged in one of a serpentine or a ladder-shaped configuration and includes a core wrapped in a fabric. The medium is disposed about open areas in the configuration. The pipe uniformly distributes effluent from the septic tank to the elongated member. In one embodiment, the core is a pliable plastic membrane and the fabric wrap is a non-woven fabric. In one embodiment, the elongated member is disposed in a box and retained by an adhesive to permit ease of manufacture, shipping, and installation. In another embodiment, the elongated member is disposed in a rigid or semi-rigid frame defining channels retaining the elongated member. The frame is detectable by a non-invasive above surface detector.

19 Claims, 9 Drawing Sheets

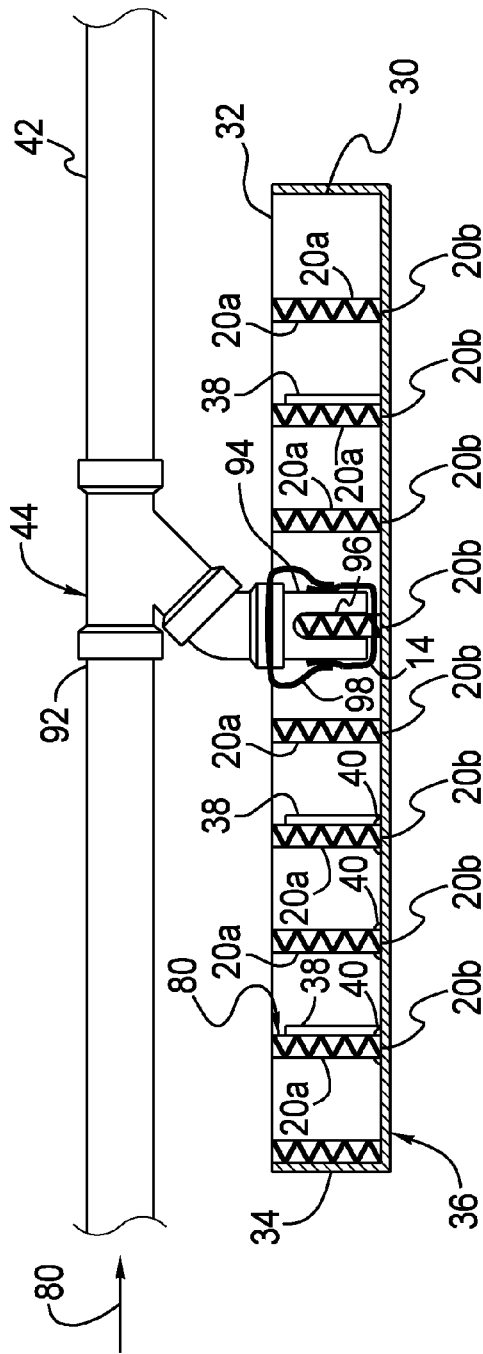
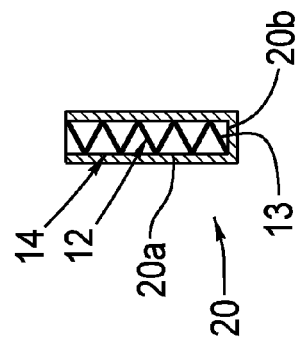
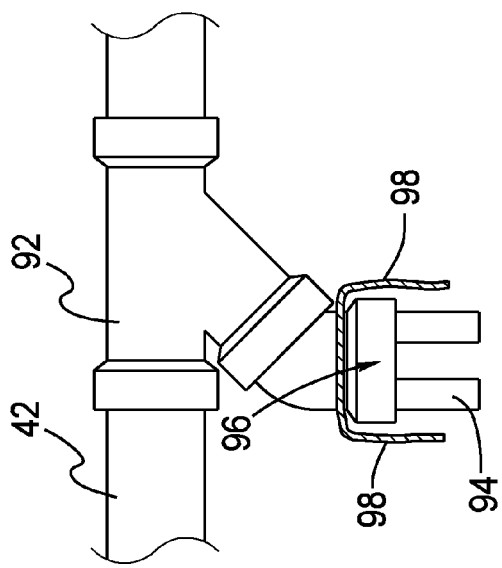

SUBSURFACE SEWAGE DISPOSAL AND WASTEWATER TREATMENT SYSTEM

CROSS-REFERENCE TO RELATED APPLICATIONS

This patent application is a continuation of U.S. patent application Ser. No. 12/328,068, filed Dec. 4, 2009 now abandoned, which claims the benefit of copending, U.S. Provisional Patent Applications, Ser. Nos. 60/992,762, filed Dec. 6, 2007, and 61/092,420, filed Aug. 28, 2008. The disclosures of these U.S. patent applications are incorporated by reference herein in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to septic systems for the treatment of sewage and wastewater and, more particularly, relates to a modular, self-contained subsurface sewage disposal/wastewater treatment system that provides improved biomat formation, improved distribution and treatment of effluent within a leach field of the system, and that is detectable within the leach field for post installation location and inspection.

2. Related Art

Septic systems, also known as subsurface sewage disposal/wastewater treatment systems, are extensively used to treat sewage and wastewater from individual residences, businesses, schools, churches, military bases, or like residential and/or commercial structures, in areas not served by sewers. In the treatment of sewage and wastewater by septic systems, solid and liquid waste from these structures, is collected in a septic tank. Because of the different densities of solid and liquid waste, the solid and liquid components of the sewage separate. The solid material is at least partially decomposed within the tank by the action of aerobic, facultative and anaerobic bacteria, resulting in a liquid effluent. The liquid effluent, which may contain suspended solids, is then conveyed out of the tank and distributed through an area of subterranean soil, which is typically referred to as a drain or leach field. The liquid effluent is passed to a series of stone or sand trenches or chambers within the leach field. The effluent percolates through the chambers and soil for treatment to reduce contaminants before being mixed with the underground water table.

Leach fields are typically divided into a number of portions (e.g., the aforementioned trenches and chambers) as dictated by the sewage treatment requirements of the structure serviced. Preferably, the effluent is distributed to the portions over a wide area to avoid, or at least substantially minimize, over-saturation of any one portion of the leach field. A plurality of underground tubes or pipes connects the septic tank to each of the portions of the leach field. Due in part to excavation needed to reach subsurface components as well as associated material and labor costs, the installation, repair and re-installation of the components of the septic system can be relatively expensive.

As can be appreciated, it is desirable to minimize installation costs and to extend the useful life of a septic system to minimize maintenance and repair costs. It is also desirable to maximize the density of treatment surfaces within each linear unit of leach field length to ultimately reduce or at least minimize the leach field area. It is further desirable to maximize the leach field's ability to evenly distribute wastewater across the full expanse of wastewater treatment surface provided by the leach field components. It is additionally advantageous to provide subsurface components that can be detected above the surface to permit post installation location for inspection and/or future maintenance.

The inventors have found that the conventional use of stone as a treatment medium can result in premature failure of a septic system leach field as the stone may be "dirty," for example, contain contaminants or fine particles that may obstruct proper flow within the system and reduce percolation into the surrounding soil. As such, the exclusion of stone as a treatment medium is a desirable improvement over the existing art.

SUMMARY OF THE INVENTION

The present invention resides in one aspect in a modular subsurface sewage disposal and wastewater treatment system for treating effluent passed from a septic tank. The system includes an elongated member arranged in a predetermined configuration, where the elongated member includes a core structure wrapped in a fabric. The system further includes a leach field medium disposed about open areas defined by the predetermined configuration and under the elongated member, and a pipe having an outlet for uniformly distributing effluent from the septic tank to the elongated member and from the elongated member to the leach field medium. In one embodiment, the predetermined configuration of the elongated member includes a serpentine-shaped form. In another embodiment, the predetermined configuration of the elongated member includes a ladder-shaped form.

In one aspect of the invention, the modular subsurface system further includes a box for retaining the elongated member and an adhesive for holding the elongated member within the predetermined configuration within the box. In one embodiment, the predetermined configuration within the box includes at least one of a serpentine-shaped form and a ladder-shaped form.

In another aspect of the invention, the modular subsurface system further includes a frame having a plurality of support members. Adjacent support members of the frame define a plurality of channels, where the channels retain the elongated member within the predetermined configuration. In one embodiment, the frame is comprised of at least one of a rigid and semi-rigid material.

In yet another aspect of the invention, the subsurface system includes a first set of the elongated member, the leach field medium and the pipe disposed in a leach field area, and a second set of the elongated member, the leach field medium and the pipe disposed in the leach field area, and an interconnectivity feature coupling the pipe of the first set and the pipe of the second set together for uniformly distributing the effluent from the septic tank to the elongated members within both of the first set and the second set. In one embodiment, the first set and the second set are arranged in one of a side-by-side arrangement and a vertically stacked arrangement.

BRIEF DESCRIPTION OF THE DRAWINGS

The features and advantages of the present invention will be better understood when the Detailed Description of the Preferred Embodiments given below is considered in conjunction with the figures provided.

FIG. 2 is a partial, cross-sectional view of an elongated member of the modular subsurface sewage disposal and wastewater treatment system of FIG. 1 taken along line 2-2;

FIG. 3A is a partial, cross-sectional view of the modular subsurface sewage disposal and wastewater treatment system of FIG. 1 taken along line 3-3;

FIG. 3B is an enlarged detail view of an outlet of a distribution pipe directing effluent into an elongated member in accordance with one embodiment of the present invention;

In these figures like structures are assigned like reference numerals, but may not be referenced in the description of all figures.

DETAILED DESCRIPTION OF THE PREFERRED EMBODIMENTS

The present invention is directed to a modular, self-contained and fully assembled subsurface sewage disposal/wastewater treatment system for use in an improved leach field arrangement. The system includes integrated interconnecting features at multiple locations to allow interchangeability of modules as well as adaptation to requirements of various individual structural and site requirements as well as goals of sewage and wastewater treatment as described herein.

Figure 1:
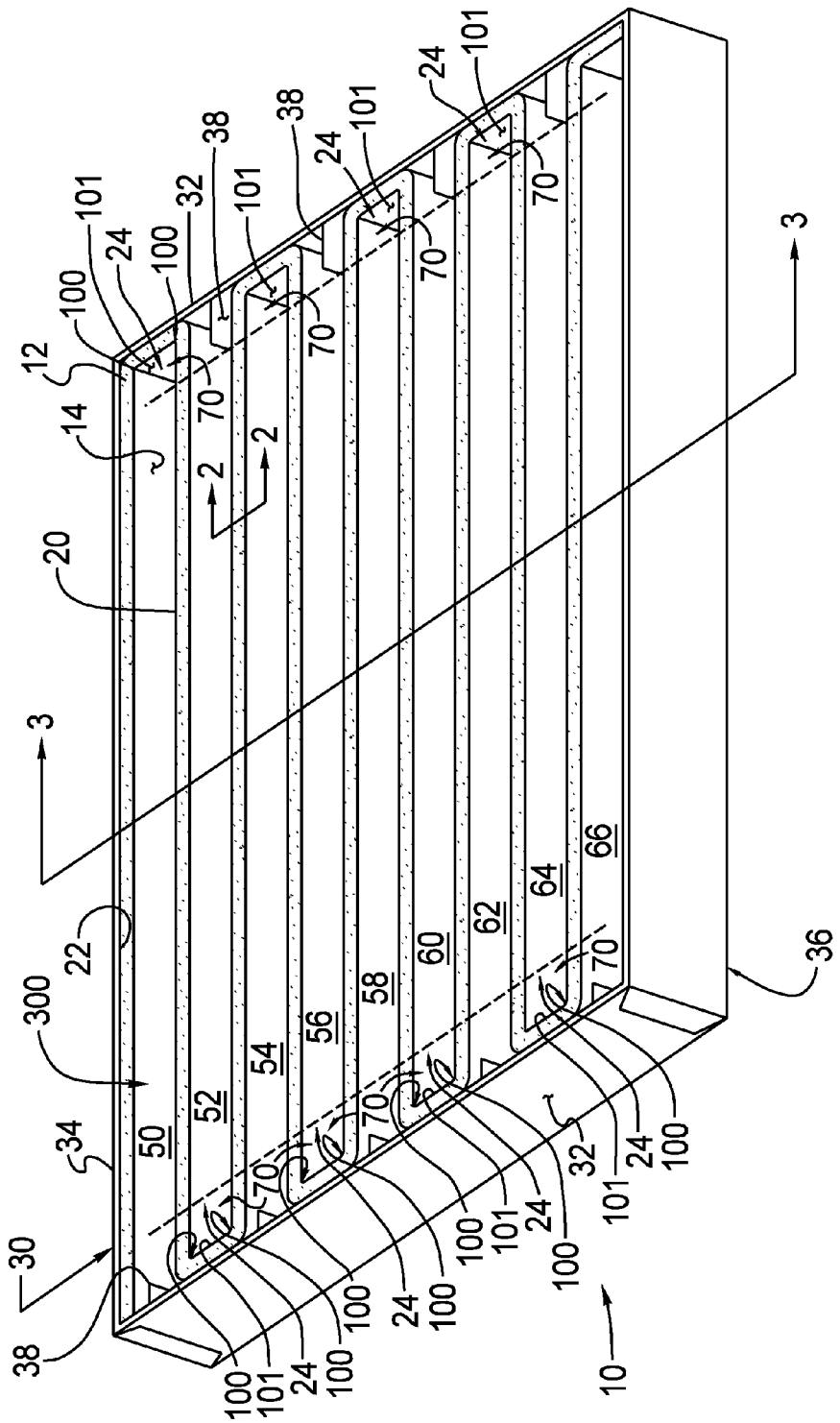
FIG. 1 is a perspective view of a modular subsurface sewage disposal and wastewater treatment system in accordance with one embodiment of the present invention.
Figure 8:
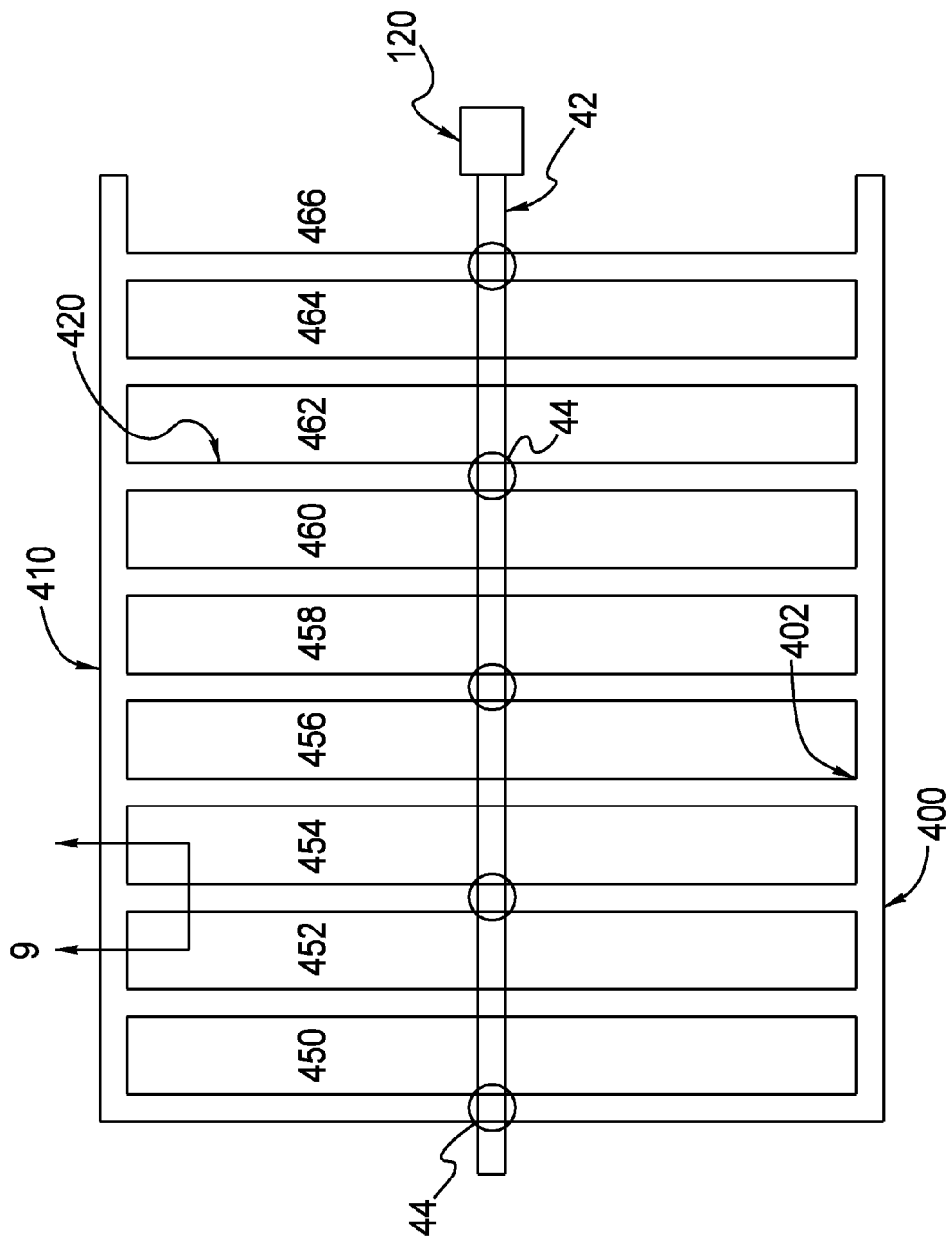
FIG. 8 is a top plan view of an elongated member of a modular subsurface sewage disposal and wastewater treatment system in accordance with one embodiment of the present invention.
Figure 9A:
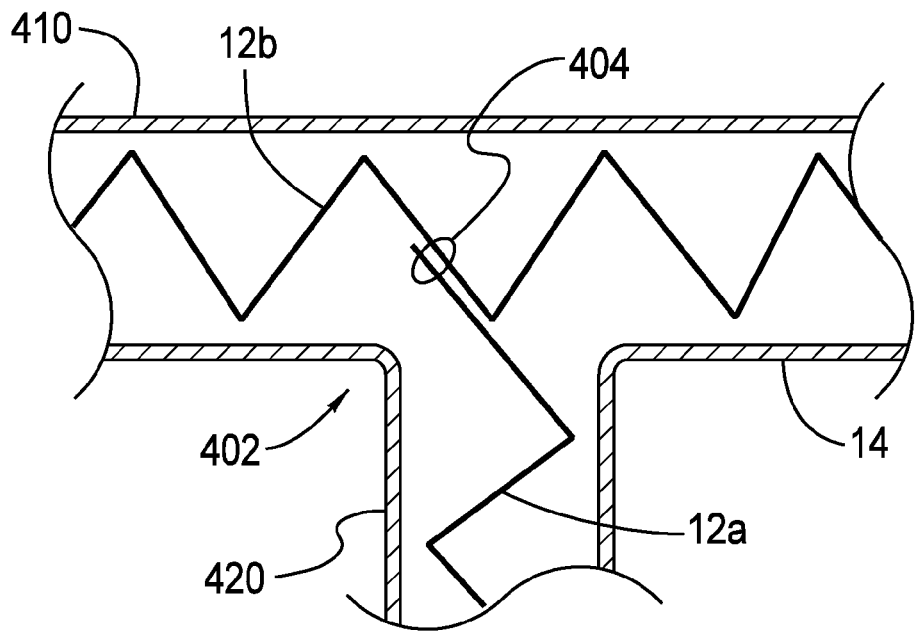
FIGS. 9A and 9B are partial, cross-sectional views of the elongated member of the modular subsurface sewage disposal and wastewater treatment system of FIG. 8 taken along line 9-9.
Figure 9B:
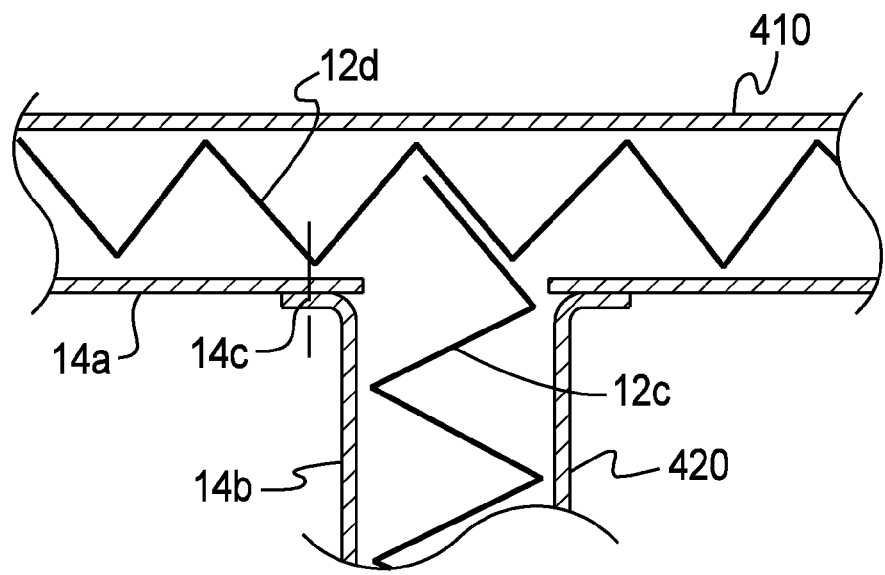

In one embodiment, illustrated in FIG. 1, the subsurface sewage disposal/wastewater treatment system is comprised of a modular, self-contained and fully assembled subsurface sewage disposal system, shown generally at 10. The subsurface sewage disposal/wastewater treatment system 10 treats solid and liquid waste from a residence, business, park or recreational area, school, church, military base, or like environment where treatment of solid and/or liquid waste is needed. As shown in FIGS. 1 and 8, the subsurface sewage disposal/wastewater treatment system 10 includes a core structure 12 wrapped in a fabric 14 and arranged in an Euclidean geometric form such as, for example, an elongated, serpentine-shaped form 300 (FIG. 1), ladder-shaped form 400 (FIG. 8), or other geometric forms such as a U-shaped form, a multiple U-shaped plane form and combinations of the above-described geometric forms. In one embodiment, the fabric wrapped core structure is configured in accordance with the mathematics of fractal geometry. In one embodiment, the core structure 12 is wrapped in the fabric 14 such that a lower surface 13 of the core structure 12 (FIG. 2) is open and exposed to treatment media (described below).

Figure 10:
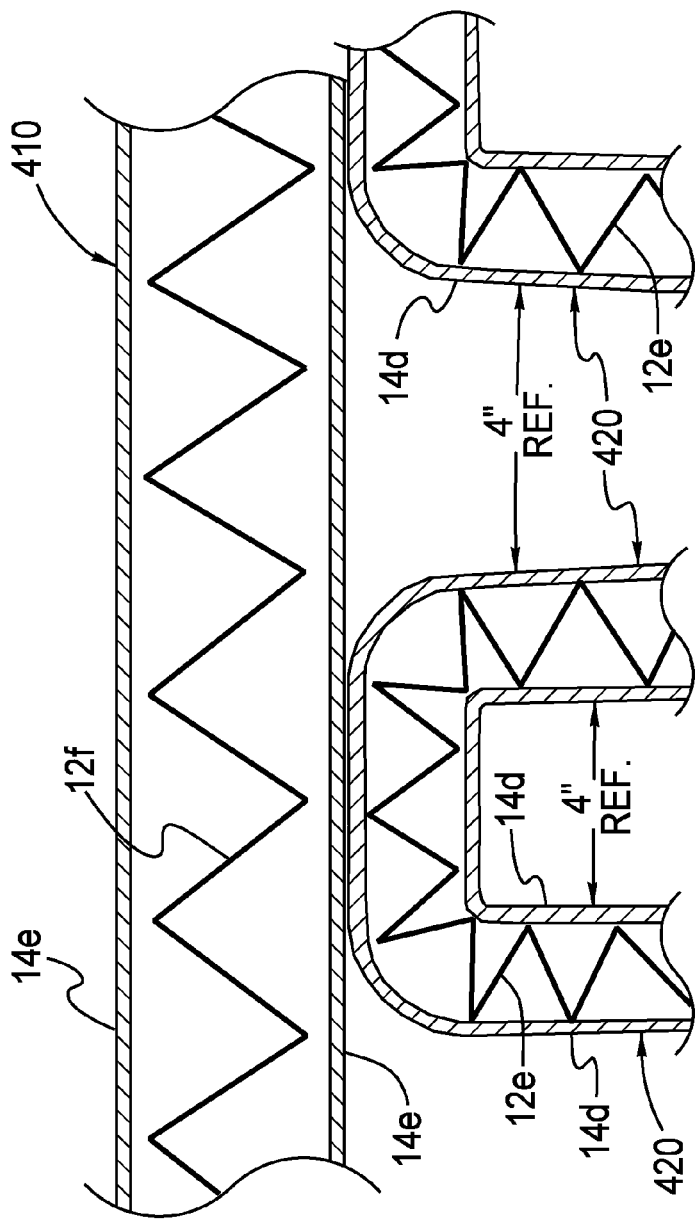
FIGS. 10 and 11 are partial, cross-sectional plan views of elongated members of the modular subsurface sewage disposal and wastewater treatment system of FIG. 8 in accordance with other embodiments of the present invention.
Figure 11:
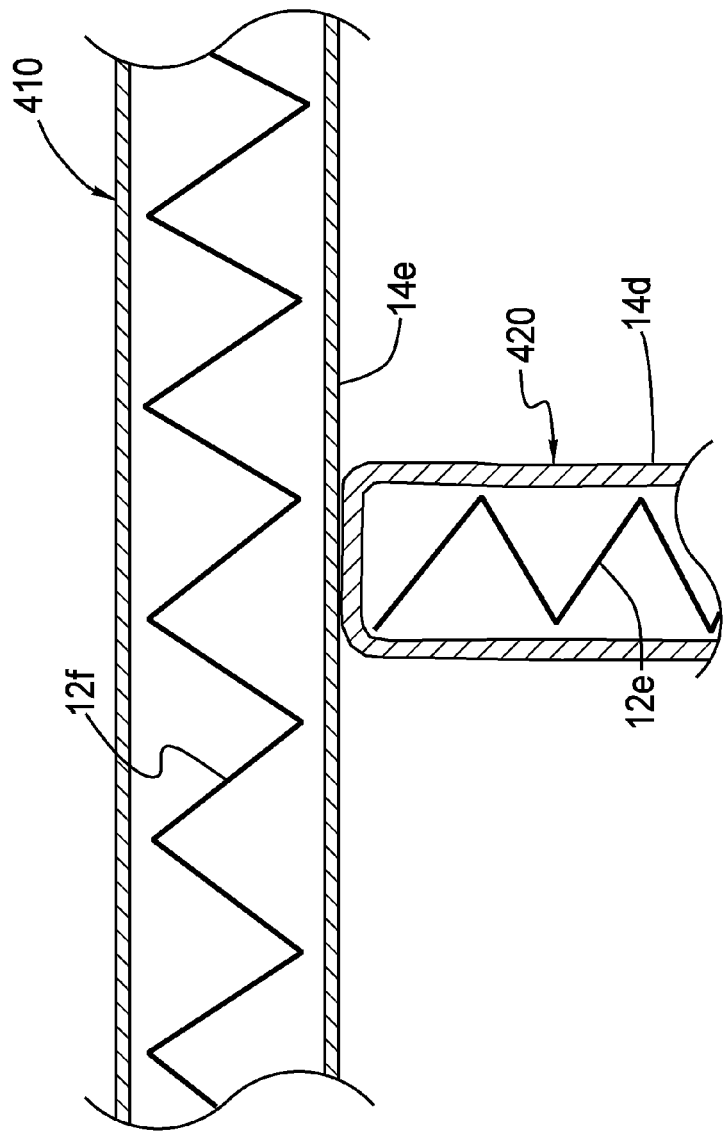

As described herein, the ladder-shape form 400 includes a geometric shape having at least two parallel effluent distribution legs 410 and a plurality of effluent distribution rungs 420 arranged between and affixed directly to or directly abutting the parallel legs 410 in a generally perpendicular pattern as shown in FIGS. 8-11. In one embodiment, core structures of one or more rungs 420 are coupled to core structures of one or more of the legs 410. For example, as illustrated in FIG. 9A, a core structure 12a of one of the rungs 420 is coupled to a core structure 12b of one of the legs 410 by, for example, a flexible connection 404. As also shown in FIG. 9A, the fabric 14 wrapping the core structures is continuous on an outer surface of the core structures 12a and 12b. For example, in one embodiment, the fabric 14 is draped over the core structures 12a and 12b as in a glove-like manner. In one embodiment, the glove-like wrapped fabric 14 exposes lower surfaces of the core structures 12a and 12b (e.g., corresponding ones of the lower surface 13 of the core structures 12a and 12b). In another embodiment, illustrated in FIG. 9B, a core structure 12c of one of the rungs 420 abuts a core structure 12d of one of the legs 410. As also shown in FIG. 9B, the fabric 14 includes a fabric portion 14a wrapping the core structure 12d and a fabric portion 14b wrapping the core structure 12c. In one embodiment the fabric portions 14a and 14b are coupled, joined or bonded such as, for example, by gluing, sewing, fastening with pins, stapling and like mechanical fasteners, ultrasonic welding, and like methods and means for securing and sealing the portions 14a and 14b about adjacent surfaces such as is illustrated generally at 14c. In other embodiments, illustrated in FIGS. 10 and 11, a core structure 12e of one of the rungs 420 abuts a core structure 12f of one of the legs 410. As also shown in FIGS. 10 and 11, the fabric 14 includes a fabric portion 14d individually wrapping the core structure 12e and a fabric portion 14e individually wrapping the core structure 12f.

Referring again to FIG. 1, in one embodiment, the core structure 12 is comprised of a pliable plastic membrane fabricated from, for example, polystyrene, polyethylene or a similar polymer. In one embodiment, the core structure 12 is comprised of an open or semi-open area surrounded by, for example, a permeable or semi-permeable plate or rib, such as a metallic or plastic plate or rib, that holds the fabric 14 wrapped about exterior surfaces of the core structure 12 apart. It should be appreciated that the permeable or semi-permeable plate or rib embodiment forms an essentially open cored elongated member (as is described below) wrapped in the fabric 14.

In one embodiment, the membrane of the core structure 12 includes opposing protrusions extending outwardly from the core structure 12 so as to maintain a separation between a body of the core structure 12 and the fabric 14 surrounding the core structure 12. In one embodiment, the membrane of the core structure 12 possesses characteristics (e.g., is semi-rigid and flexible) such that the core structure 12 can adapt configurations including the aforementioned serpentine form 300 and ladder form 400 having about ninety-degree)(90°) angles, shown in FIG. 1 generally at 100 and FIGS. 8 and 9 generally at 402, and abutting or coupled members. In one embodiment, the fabric 14 is comprised of a non-woven fabric such as geotextile fabrics as are commercially available under brand names TYPAR 3401 and 140EX from Thrace-Linq, Inc. (Summerville, S.C., USA) which possess qualities including, for example, effective open pore spaces that allow minimal restriction to passage of water and liquid sewage effluent there through, and are durable to withstand indeterminate lengths of time buried within soil and/or are in a continuously saturated condition. In accordance with the present invention, the core membrane 12 and non-woven fabric 14 do not degrade or decompose when subjected to long-term immersion in water, sewage or when buried within soils.

FIG. 2 is a cross-sectional view of the core structure 12 and fabric wrap 14 taken along line 2-2 of FIG. 1. In one embodiment, the core structure 12 and the fabric wrap 14 form an elongated member 20 that is about, but not limited to, six inches (6 in.) in height by about one inch (1 in.) thick. In other embodiments, the elongated member 20 is about, for example, one of seven inches (7 in.), twelve inches (12 in.), thirteen inches (13 in.), and twenty-six inches (26 in.) in height. In one embodiment, the elongated member 20 is arranged in the serpentine form 300 (FIG. 1) or ladder form 400 (FIG. 8) and disposed in a support structure 30 such as, for example, a five-sided corrugated cardboard box having a length L and a width W. In one embodiment, illustrated in FIG. 1, the box 30 includes a first side 32, corresponding to width W, that is about, for example, forty-eight inches (48 in.) in length, a second side 34, corresponding to length L, that is about, for example, sixty-eight inches (68 in.) in length, and a floor 36. Thus, the serpentine form 300 of the elongated member 20 is retained within about forty-eight inches (48 in.) in width and about sixty-eight inches (68 in.) in length. As shown in FIG. 1, a first side 22 of serpentine form 100 of the elongated member 20 is parallel to the second side 34 of the cardboard box 30 while bends, shown generally at 24, in the serpentine form 300 of the elongated member 20 are parallel to the first side 32 of the box 30. In one embodiment, the elongated member 20 is held in place within the box 30 with a biodegradable adhesive 40. In another embodiment, the elongated member 20 is held in place with a friction fit between tabs or protrusions 38 projecting from the walls of the box 30. As should be appreciated, the protrusions 38, adhesive 40 and the box 30 are structural components of the subsurface sewage disposal system 10 which allow ease of manufacture, shipping, and installation, and which combine to contribute, for example, to modular aspects of the present invention.

Figure 4:
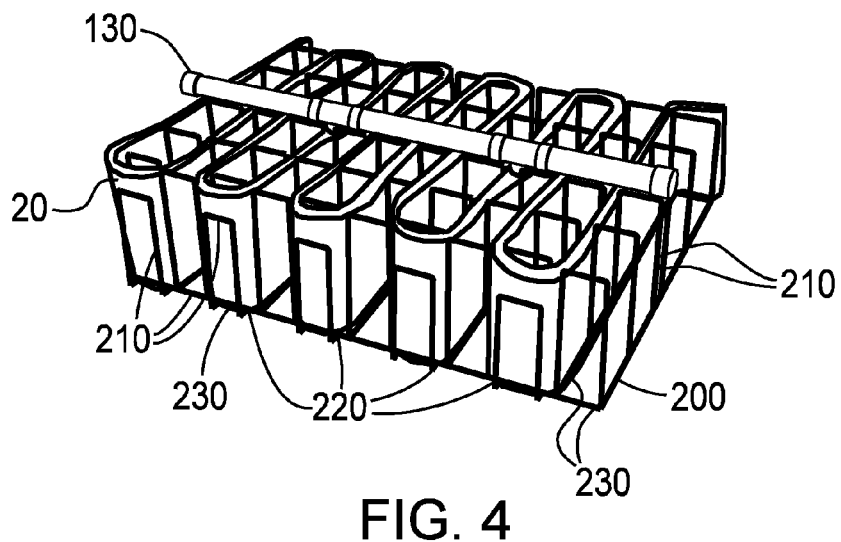
FIGS. 4 and 5 are perspective views of a modular subsurface sewage disposal and wastewater treatment system in accordance with one embodiment of the present invention.
Figure 5:
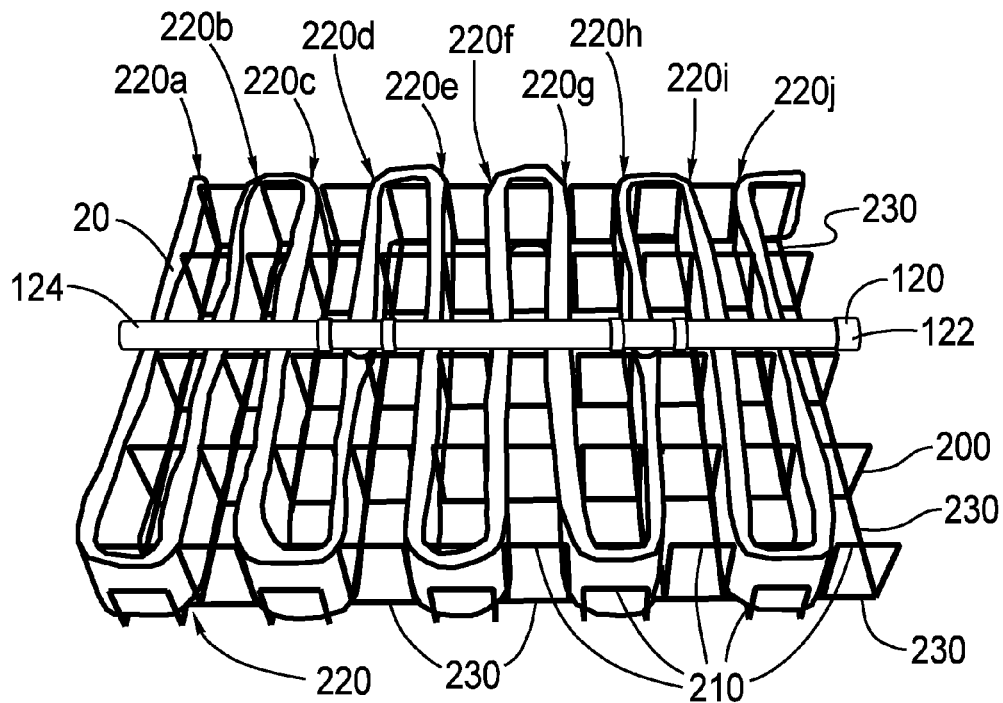
Figure 6:
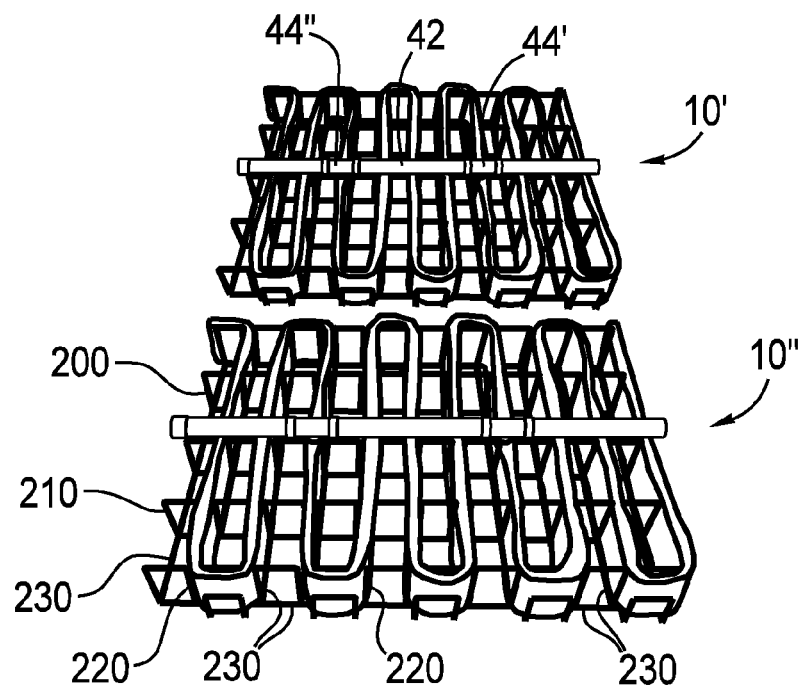
FIG. 6 is a perspective view of a pair of modular subsurface sewage disposal and wastewater treatment system arranged in a side-by-side arrangement providing an increased effective leach area and storage capacity in accordance with one embodiment of the present invention.
Figure 7:
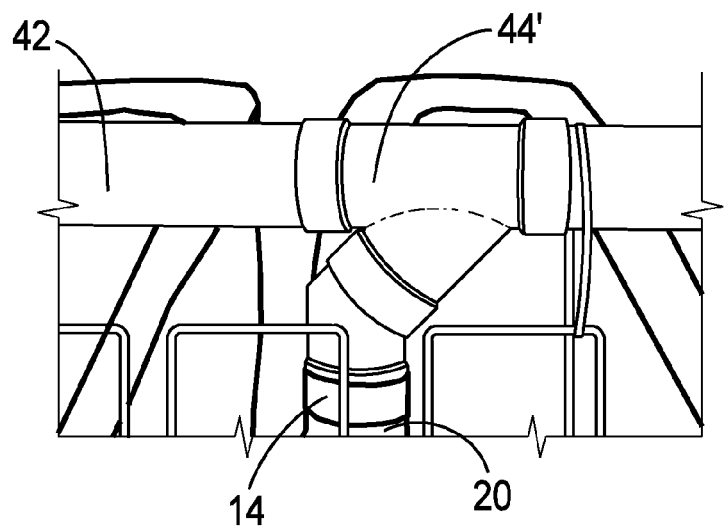
FIG. 7 illustrates an outlet for directing effluent into the elongated member of the modular subsurface sewage disposal and wastewater treatment system in accordance with one embodiment of the present invention.
Figure 12:
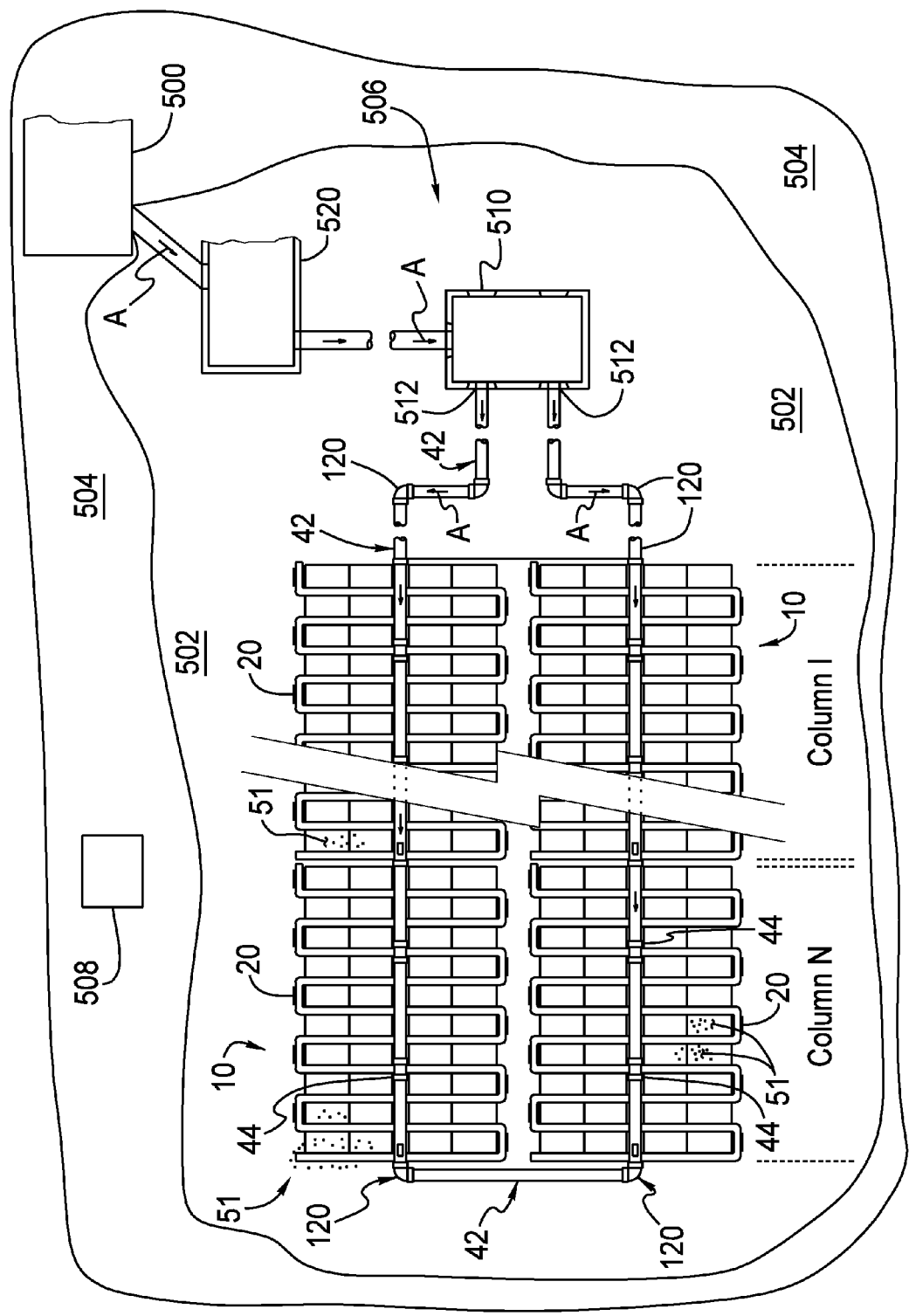
FIG. 12 is a schematic plan view of modular subsurface sewage disposal and wastewater treatment systems of the present invention coupled in a series arrangement to service a structure of interest.

In one embodiment, illustrated in FIGS. 4 and 5, the elongated member 20 is arranged in the serpentine form 300 and disposed in a support structure including a rigid or semi-rigid frame 200. It should be appreciated that the ladder-shaped form 400 may similarly be disposed in the support structure 200. In one embodiment, the rigid or semi-rigid frame 200 is comprised of, for example, ferrous or non-ferrous wire, plastic, cellulose, timber, plant-derived man-made fibrous substance, or like petroleum or hydrocarbon based materials. As shown in FIG. 5, the frame 200 includes a plurality of support members 210 arranged to define a plurality of channels 220 between adjacent support members 210 such as, for example, channels 220a-220j, and a floor 230. As such, the adjacent ones of the plurality of support members 210 cooperate such that the elongated member 20 is retained within the channels 220 and the floor 230 by, for example, a friction fit with corresponding support members 210. In one embodiment, a plurality of ties or fasteners (not shown) may couple the elongated member 20 to the frame 200. In one embodiment, illustrated in FIGS. 3-8, an effluent/wastewater distribution pipe 42 is coupled to a portion of the frame members 200 (e.g., a top portion) and is directly connected to the elongated member 20 for uniformly and consistently introducing effluent to the elongated member 20 and then to the treatment medium. Each effluent/wastewater distribution pipe 42 includes an interconnectivity feature 120. In one embodiment, the interconnectivity feature 120 is one of a male or a female coupling, fitting or adapter for joining sections of pipe. As shown in FIG. 5, a first end of the distribution pipe 42 includes a female coupling 122 and a second end of the pipe 42 includes a male coupling 124 or, simply, an unobstructed end of the pipe 42. As shown in FIG. 12, a plurality of interconnectivity features 120 couple the distribution pipes 42 of a plurality of modules 10 in a series arrangement of, for example, two rows and N columns. The plurality of modules 10 are coupled to discharge outlets or ports 512 of a sewage disposal and/or wastewater treatment vessel such as, for example, a distribution tank 510 and/or a septic tank 520, for directing a flow of effluent (depicted by arrows A) from a structure of interest 500 through the vessel 510 or 520 to the elongated members 20 of the modules 10 and approved leach field medium 51 disposed between portions of the members 20 (described below) for treatment. As can be appreciated, the interconnectivity features 120 couple the distribution pipes 42 of an arrangement of two or more modules 10 (e.g., the above described arrangement of rows and columns of modules 10 that may vary to suit the treatment requirements of the structure of interest 500) for directing the flow of effluent from the structure 500 to the two or more modules 10. In one embodiment, a last module 10 coupled in an arrangement of modules 10 (e.g., at an end of a row) is terminated with a capping device 130 (FIG. 4) such as, for example, a plug or cap end. In another embodiment, the distribution pipes 42 of the two or more modules 10 are coupled together to form a closed loop arrangement (FIG. 12). As shown in FIG. 12, the interconnectivity feature 120 allows connection of a series of modules 10 of seemingly any desired length to meet the requirements of a particular leach field design.

As is shown in FIG. 12, a leach field 502 is prepared by excavating soil 504 in a predetermined area 506 surrounding the structure 500 (e.g., residential, commercial, recreational, military, or the like) serviced by the sewage disposal/wastewater treatment system. Treatment components of the subsurface sewage disposal/wastewater treatment system are then installed into the area 506 of the previously prepared soil 504. In one embodiment, the prepared soil may be supplemented by introducing a highly permeable material such as, for example, sand. In accordance with the present invention, the box 30 or the frame 200 that contains the elongated member 20 arranged in the serpentine form 300 or ladder-shaped form 400 along with a supplied integral effluent distribution piping system 42, is disposed in the excavated area 506 and on the prepared soil 504. As noted above, the adhesive 40 and the box 30, or support member 210 and channels 220, cooperate to provide structural support to the elongated member 20 such that installation is not labor intensive. For example, one or two persons may dispose the box 30 or frame 200 containing the elongated member 20 and the piping system 42 in the excavated area 506 with relative ease. Once disposed in the excavated area little, if any, subsequent alignment of the elongated member 20 is needed. Rather, once the distribution piping system 42 is coupled to the supply of effluent, the modules 10 are operational. As noted below, in one embodiment, treatment medium 51 is placed about open areas defined by the elongated member 20. This efficient manner of installation is a marked improvement over conventional installation procedures. For example, the inventors have discovered that ease of installation is afforded the inventive subsurface sewage disposal/wastewater treatment system 10 by its novel, intact structural integrity provided by the adhesive 40 or channels 220, the serpentine or ladder-shaped membrane 12 wrapped in fabric 14, the support structure (e.g., the box 30 or frame 200) and the incorporated distribution piping system 42. The efficient installation procedures also extend to multiple modules installation. For example, after a first one 10' of the inventive subsurface sewage disposal/wastewater treatment system 10 is laid into an open excavation area 506 (as described above), a second one 10" of the inventive subsurface sewage disposal/wastewater treatment system 10 may be placed along side the first system 10' as is shown in, for example, FIG. 6. The two respective distribution piping systems 42 are couplable, e.g., are interconnectable via mating connectivity features 120, to uniformly distribute effluent between the systems 10' and 10". Suitable sealing means, as are generally known in the art, may be employed at the junctures of the two or more subsurface sewage disposal/wastewater treatment systems 10. The process of coupling sewage disposal/wastewater treatment systems 10 may be repeated without restriction until a desired length and/or width of a sewage disposal/wastewater treatment system leach field is achieved such as is illustrated in FIG. 12.

With the support structure (e.g., the box 30 or frame 200) and the elongated member 20 in place, open areas 50, 52, 54, 56, 58, 60, 62, 64, 66 between runs of the elongated, serpentine form 300 of member 20 (and corresponding areas between adjacent channels 220 of the frame 200) are filled with approved leach field medium 51 such as, for example, washed sand of particular gradation. Similarly, open areas 450, 452, 454, 456, 458, 460, 462, 464, and 466 between runs of the elongated, ladder-shaped form 400 of member 20 are filled with the approved leach field medium 51. In one embodiment, the open areas 50, 52, 54, 56, 58, 60, 62, 64, 66 (as are open areas 450, 452, 454, 456, 458, 460, 462, 464, and 466) are between about two inches (2 in.) and about six inches (6 in.) in width over substantially all their length. In one embodiment, the leach field medium 51 is also disposed at a depth of about two inches (2 in.) to about six inches (6 in.) directly beneath the support structure (e.g., the cardboard box 30 or frame 220) in addition to an area of about two inches (2 in.) to about six inches (6 in.) immediately surrounding the cardboard box 30 on each of its sides 32 and 34, or around a perimeter of the frame 200.

With the support structure (e.g., the box 30 or frame 200), the elongated member 20 and the medium 51 in place, effluent is supplied to the elongated member 20 by the pipes 42 that run across a surface (e.g., a top surface) of the serpentine/ladder-shape configuration, as is illustrated in FIGS. 3A, 6, 7, 8 and 12. FIG. 3A is a cross-sectional view taken along line 3-3 of FIG. 1. As shown in FIG. 3A, the pipes 42 include at least one outlet 44 for directing effluent 80 down into the elongated member 20. In another embodiment, illustrated in FIGS. 6 and 7, the pipe 42 include at least two outlets 44' and 44" for directing effluent 80 down into the elongated member 20. In yet another embodiment, the effluent 80 is directed down into the at least one of the legs 410 and the rungs 420. For example, as illustrated in FIG. 8, the effluent 80 is directed by a plurality of outlets 44 down into a plurality of the rungs 420. As is generally known, effluent is supplied by gravity flow, pressurized flow, or combinations thereof. In one embodiment illustrated in FIG. 3B, the outlet 44 includes a fitting 92 (e.g., "T" or "Y" shaped fitting) and a section of pipe 94 coupled to and extending from the fitting 92. In one embodiment, the pipe 94 includes a slot 96 configured to receive a width of the elongated member 20 therein. In one embodiment, illustrated in FIGS. 3A, 3B and 7, the elongated member 20 includes a portion having a break or cut in the fabric 14 such that the core member 12 is received in the slot 96 and the fabric 14 covers an outer surface of the 94. In one embodiment, a shroud 98 is disposed about the outlet 44 such that the shroud 98 covers an area of engagement of the core member 12 and the slot 96. For example, the shroud 98 may include a central bore that accepts the pipe 94 and a portion of the fitting 92 to allow the shroud 98 to be disposed between the fitting 92 and the core member 12. In one embodiment, the shroud 98 is comprised of the aforementioned geotextile fabric. In one embodiment, the shroud 98 is coupled, joined or bonded such as, for example, by gluing, sewing, fastening with pins, stapling and the like, ultrasonic welding, and like methods and means for securing, to the fabric 14. In one embodiment, the shroud 98 is secured about the fitting 92 by, for example, a tie or clamp (not shown).

As noted above and shown in FIGS. 6 and 12, it should be appreciated that one or more of the modular subsurface sewage disposal/wastewater treatment systems 10 can be disposed within the excavated area 506 to achieve the leach field 502 of desired characteristics to service the structure of interest 500 (e.g., a residential, commercial, recreational, school, church, military or like structure). For example, two or more modular subsurface disposal/wastewater treatment systems 10' and 10" (e.g., boxes 30 or frames 200 each including an elongated member 20 and approved leach field medium), can be disposed side-by-side to form rows in the leach field 502. Similarly, two or more modular sewage disposal/wastewater treatment systems 10 may be coupled in linear series to provide a desired length for each of the one or more rows and columns within the leach field 502. In one embodiment, the rows are, for example, about sixty-eight inches (68 in.) wide and are, for example, of a length that is a multiple of about forty-eight inches (48 in.). A maximum length of a row is dictated by local regulatory restrictions of city or town building and/or health departments and/or agencies, or by engineering Best Management Practices, as are generally known in the art. As such, each row and/or column may include two or more modular subsurface disposal systems 10 as is required to meet particular sewage disposal/wastewater treatment needs. It should be appreciated that while the modular subsurface disposal system 10 is described above as being of particular height, length and width, it is within the scope of the present invention to vary these dimensions as needed to address a variety of sewage disposal/wastewater treatment requirements. It can be further appreciated that the above described system may have a height dimension of between, for example, about three inches (3 in.) and about forty-eight inches (48 in.) individually or in a stacked arrangement, and can be used when the treatment system is disposed in or on the earth in a longitudinal linear fashion. When the above described disposal/treatment system is installed in a predominantly vertical tower-like (e.g., stacked) configuration the height of the invention may have unlimited proportions.

With respect to leach field characteristics, in accordance with the present invention, biological treatment of effluent occurs within an area of approved leach field treatment medium 51 that is disposed adjacent to and below the elongated member 20. That is, the medium 51 may be disposed within and below the open areas 50, 52, 54, 56, 58, 60, 62, 64, 66 between runs of the elongated, serpentine form 300 of member 20 (FIG. 1), the open areas 450, 452, 454, 456, 458, 460, 462, 464, and 466 of the ladder-shaped form 400 of the elongated member 20 (FIG. 8), as well as corresponding areas between the channels 220 of the frame 200 and, in particular, adjacent to vertical 20a and bottom 20b fabric covered surfaces of the elongated member 20 (FIG. 2), as well as the areas surrounding and under the box 30 and/or frame 200. It should be appreciated, however, that an internal area 70 proximate to each of the bends 24 and 402 in the serpentine/ladder-shaped forms of the elongated member 20 will not provide treatment to effluent discharged from each of surfaces 101 to the same degree as from the open areas 50, 52, 54, 56, 58, 60, 62, 64, 66 of the elongated, serpentine form 300, open areas 450, 452, 454, 456, 458, 460, 462, 464, and 466 of the ladder-shaped form 400, and between runs of the elongated member 20 (e.g., vertical 20a and bottom 20b fabric covered surfaces of the elongated member 20) and areas surrounding and under the box 30 and/or frame 200. As such, the surfaces 101 are discounted in a determination of an effective leach area. In one embodiment, the internal area 70 spans about four inches (4 in.) in length from each of the bends 24. Accordingly, and in accordance with one embodiment of the present invention, a total surface area of the elongated member 20 that provides effluent treatment within a leach area is about fifty-seven square feet (57 sq. ft.). As is generally known in the art, effluent treatment is a function of the provided leach treatment area.

It should be appreciated that leach fields of greater treatment area and greater storage capacity per linear foot can be achieved by stacking modules, for example, placing a first subsurface sewage disposal system 10 including a first module (e.g., the box 30 or the frame 200 and the elongated member 20) in an excavated leach field area, and placing a second subsurface sewage disposal system 10 including a second module above the first module. In such a stacked configuration, effluent is supplied to the upper, second module as described above, and pipes interconnecting the first and second modules would hydraulically pass effluent to the lower, first module. In another embodiment, the effluent flow is divided between the stacked modules to form a treatment train.

In one aspect of the invention, the aforementioned module includes the box 30 or frame 200 and elongated member 20 that is about forty-eight inches (48 in.) wide by about sixty-eight inches (68 in.) long is reduced in size. For example, in one embodiment, a similarly functioning module is configured as about thirty inches (30 in.) long by about forty-eight inches (48 in.) wide, with the long lengths of the serpentine/ladder-shaped forms parallel to the thirty inch (30 in.) dimension. The reduced sized subsurface sewage disposal/wastewater treatment system module provides an effective leach area of approximately one half of the previously described system for square feet per linear foot of leach field and storage capacity. It should be appreciated that the reduced sized module may also be used side-by-side or stacked in multiple unit arrangements, as discussed above. Additionally, it should be appreciated that the larger and reduced sized modules may be connected in various arrangements within one system as sewage disposal and/or wastewater treatment requirements for a particular implementation dictate.

As described herein, the inventors have discovered that subsurface sewage disposal/wastewater treatment systems 10 including one or more of the modules (e.g., the box 30 or frame 200 and the elongated member 20 disposed therein in a serpentine/ladder-shaped form) provide improved biomat formation and effluent treatment. The disclosed system and novel configuration substantially eliminates areas of competing biomat that is a perceived deficiency with conventional arrangements. In other words, the novel arrangements as described herein minimize, if not eliminate, completing biomat areas such that the areas do not interfere with, and thus negate each other. Additionally, the aforementioned arrangements provide for distribution which ensures that areas of unwanted prolonged saturation within the treatment medium does not occur and, as such, provides for uniformly oxygenated biomat development that is seen as an improvement over conventional systems that merely include random disbursement of effluent and thus random and poorly oxygenated biomat development. Moreover, superior treatment of effluent is achieved by maximizing the density of treatment surfaces within each linear unit of leach field length.

Yet another perceived improvement over conventional systems results from the use of the frame 200 comprising a metal including ferrous or non-ferrous material such as, for example, wire. In this embodiment, the location of the subsurface (e.g., buried) system 10 within the leach field 502 can be identified without excavation by use of, for example, a metal or other ferrous material detector 508. As can be appreciated, the ability to detect the location of the buried system without excavation provides significant advantages in time and cost of repairing and maintaining the system 10. Additionally, the use of an above surface detector 508 may permit non-invasive inspection of key elements of the system to ensure that installation was performed to specification such as, for example, in the designed location and/or configuration to achieve the desired sewage disposal and/or wastewater treatment. In one embodiment, the box 30 or frame 200 is comprised of a material that is not detectable by a non-invasive above surface detector, but has incorporated in its construction a feature or features (e.g., retaining clips, fasteners, and the like) that are detectable by the non-invasive above surface detector 508.

Although this invention has been shown and described with respect to the detailed embodiments thereof, it will be understood by those of skill in the art that various changes may be made and equivalents may be substituted for elements and steps thereof without departing from the scope of the invention. In addition, modifications may be made to adapt a particular situation to the teachings of the invention without departing from the essential scope thereof. Therefore, it is intended that the invention not be limited to the particular embodiments disclosed in the above detailed description, but that the invention will include all embodiments falling within the scope of the above description.

What is claimed is:

1. A subsurface sewage disposal and wastewater treatment system for treating effluent passed from a septic tank, the system comprising:
    an elongated member including a core structure wrapped in a fabric;
    a support structure having a plurality of support members, the plurality of support members defining a floor and a plurality of channels, the floor and the plurality of channels cooperate to position and retain the elongated member within a predetermined configuration to receive a flow of effluent;

leach field medium disposed about open areas defined by and surrounding the support structure and the elongated member retained therein; and a pipe having an outlet, the pipe coupled to the support structure, the outlet disposed in at least one of the plurality of channels about a portion of the core structure of the elongated member to uniformly distribute the flow of effluent from the septic tank to the elongated member and from the elongated member to the leach field medium.

2. The subsurface system of claim 1, wherein the predetermined configuration includes a serpentine-shaped form.

3. The subsurface system of claim 1, wherein the predetermined configuration includes a ladder-shaped form having at least two distribution legs and a plurality of distribution rungs arranged therebetween, at least one of the plurality of distribution rungs being at least one of affixed directly to the at least two distribution legs and directly abutting the at least two distribution legs.

4. The subsurface system of claim 1, wherein the predetermined configuration includes a form defined by the mathematics of fractal geometry.

5. The subsurface system of claim 1, wherein the core structure is comprised of a pliable plastic membrane.

6. The subsurface system of claim 1, wherein the fabric is comprised of a non-woven fabric.

7. The subsurface system of claim 1, wherein the support structure is comprised of a box, the plurality of support members are comprised of protrusions projecting from walls of the box, the support structure further including an adhesive for holding the elongated member to at least one of the protrusions.

8. The subsurface system of claim 7, wherein the predetermined configuration includes at least one of a serpentine-shaped form and a ladder-shaped form.

9. The subsurface system of claim 1, wherein the support structure is comprised of a frame.

10. The subsurface system of claim 1, wherein the support structure is comprised of at least one of a rigid and semi-rigid material.

11. The subsurface system of claim 1, wherein the support structure is comprised of at least one of ferrous and non-ferrous wire, plastic, cellulose, timber, a plant-derived man-made fibrous substance, and petroleum and hydrocarbon based materials.

12. The subsurface system of claim 1, wherein the floor and the plurality of channels retain the elongated member by a friction fit between adjacent ones of the plurality of support members.

13. The subsurface system of claim 1, wherein the floor and the plurality of channels retain the elongated member with at least one of a plurality of ties and fasteners to couple the elongated member to adjacent ones of the plurality of support members.

14. The subsurface system of claim 1, wherein the support structure is comprised of a material that is detectable by a non-invasive above surface detector.

15. The subsurface system of claim 14, wherein the support structure is comprised of a ferrous material and the detector is a metal detector.

16. The subsurface system of claim 1, including:

a first set including the elongated member, the support structure, the leach field medium and the pipe disposed in a leach field area; and a second set including the elongated member, the support structure, the leach field medium and the pipe disposed in the leach field area; and an interconnectivity feature coupling the pipe of the first set and the pipe of the second set together to uniformly distribute the flow of effluent from the septic tank to the elongated members within both of the first set and the second set.

17. The subsurface system of claim 16, wherein the first set and the second set are arranged in one of a side-by-side arrangement and a vertically stacked arrangement.

18. The subsurface system of claim 1, wherein the leach field medium is comprised of sand including a highly predictable and definable composition by percentage of grain size.

19. A subsurface sewage disposal and wastewater treatment system for treating effluent passed from a septic tank, the system comprising:

an elongated member including a core structure wrapped in a fabric;

a frame having a plurality of support members, the support members defining a floor and a plurality of channels, the floor and the plurality of channels receive and retain the elongated member within a predetermined configuration;

leach field medium disposed about open areas defined by and surrounding the frame and the elongated member retained therein; and a pipe having an outlet, the pipe coupled to the frame, the outlet disposed within one of the channels about a portion of the elongated member to uniformly distribute a flow of effluent from the septic tank to the elongated member and from the elongated member to the leach field medium during treatment of the flow of effluent.

* * * * *